United States Patent
Ramachandra

(10) Patent No.: US 11,172,039 B2
(45) Date of Patent: *Nov. 9, 2021

(54) VALIDATING PUSH COMMUNICATIONS

(71) Applicant: International Business Machines Corporation, Armonk, NY (US)

(72) Inventor: Anoop G. M. Ramachandra, Mysore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/810,060

(22) Filed: Nov. 11, 2017

(65) Prior Publication Data

US 2018/0097901 A1    Apr. 5, 2018

Related U.S. Application Data

(63) Continuation of application No. 15/282,296, filed on Sep. 30, 2016.

(51) Int. Cl.

| | |
|---|---|
| *G06F 15/16* | (2006.01) |
| *H04L 29/08* | (2006.01) |
| *H04L 12/58* | (2006.01) |
| *H04L 12/18* | (2006.01) |
| *H04W 4/14* | (2009.01) |
| *G06F 15/173* | (2006.01) |

(52) U.S. Cl.
CPC .......... *H04L 67/26* (2013.01); *H04L 12/1859* (2013.01); *H04L 51/24* (2013.01); *H04L 67/10* (2013.01); *H04L 67/12* (2013.01); *H04W 4/14* (2013.01)

(58) Field of Classification Search
CPC ..... H04L 67/26; H04L 12/1859; H04L 67/10; H04L 67/12; H04L 51/24; H04W 4/14
USPC .................................................. 709/205, 207
See application file for complete search history.

(56) References Cited

U.S. PATENT DOCUMENTS

| | | | |
|---|---|---|---|
| 8,788,881 B2 | 7/2014 | Salomon et al. | |
| 9,313,230 B1* | 4/2016 | Kruse | ............... G06F 11/004 |
| 9,419,968 B1* | 8/2016 | Pei | .......... G06F 21/31 |

(Continued)

OTHER PUBLICATIONS

Mell, P et al., "The NIST Definition of Cloud Computing," National Institute of Standards and Technology (NIST), US Dept. of Commerce, Special Pub. 800-145, Sep. 2011, retrieved from the Internet:<http://csrc.nist.gov/groups/SNS/cloudcomputing/index.html>, 7 pg.

(Continued)

*Primary Examiner* — Karen C Tang
(74) *Attorney, Agent, or Firm* — Cuenot, Forsythe & Kim, LLC

(57) ABSTRACT

Validating push messages can include, responsive to receiving a push message intended for delivery to a recipient, storing, using a processor, the push message within an approval queue, sending, using the processor, a message including content of the push message to a reviewing device of a reviewing user, and receiving, using the processor, a reply from the reviewing device. The push message can be selectively provided, using the processor, from the approval queue to a push message delivery system based upon whether the reply indicates approval of the content of the push message.

7 Claims, 5 Drawing Sheets

500

| Push Message | Reviewer A | Reviewer B | Reviewer C |
|---|---|---|---|
| Push Message 505 | Approve | Disapprove | Approve |
| Push Message 510 | Disapprove | Pending | Approve |
| Push Message 515 | Pending | Approve | Approve |

(56) References Cited

U.S. PATENT DOCUMENTS

| | | | |
|---|---|---|---|
| 9,894,579 B2* | 2/2018 | Velev | H04W 76/38 |
| 10,484,329 B2* | 11/2019 | Zhang | H04L 51/046 |
| 2004/0230659 A1* | 11/2004 | Chase | H04L 12/581 |
| | | | 709/206 |
| 2005/0278297 A1* | 12/2005 | Nelson | G06Q 30/01 |
| 2007/0255957 A1* | 11/2007 | Arnone | H04L 12/1895 |
| | | | 713/182 |
| 2008/0082381 A1* | 4/2008 | Muller | G06Q 10/10 |
| | | | 705/344 |
| 2011/0029598 A1* | 2/2011 | Arnold | H04L 67/26 |
| | | | 709/203 |
| 2012/0170451 A1* | 7/2012 | Viswanathan | H04W 4/70 |
| | | | 370/230 |
| 2014/0066111 A1* | 3/2014 | Lin | H04L 51/12 |
| | | | 455/466 |
| 2014/0282353 A1* | 9/2014 | Jubran | G06F 8/00 |
| | | | 717/101 |
| 2014/0289320 A1 | 9/2014 | Fan et al. | |
| 2014/0310365 A1* | 10/2014 | Sample | H04L 51/16 |
| | | | 709/206 |
| 2015/0006688 A1* | 1/2015 | Sanghvi | H04L 41/0843 |
| | | | 709/221 |
| 2015/0244754 A1* | 8/2015 | Beckham, Jr. | H04L 65/4076 |
| | | | 709/219 |
| 2017/0140040 A1* | 5/2017 | Gottemukkala | G06Q 10/067 |
| 2017/0161657 A1* | 6/2017 | Barnes | G06Q 10/0639 |
| 2017/0163756 A1* | 6/2017 | Salmi | H04L 67/2819 |
| 2017/0177324 A1* | 6/2017 | Frank | G06F 16/173 |
| 2018/0052941 A1* | 2/2018 | Codignotto | G06F 17/30896 |
| 2018/0060954 A1* | 3/2018 | Yin | G06Q 40/025 |
| 2018/0115505 A1* | 4/2018 | Arshad | H04L 51/16 |
| 2018/0139671 A1* | 5/2018 | Velev | H04W 76/27 |
| 2018/0146347 A1* | 5/2018 | Rudge | H04W 68/005 |

OTHER PUBLICATIONS

IBM: List of IBM Patents or Patent Applications Treated as Related, 2 pg.

Ramachandra, A.G.M., "Validating Push Communications," U.S. Appl. No. 15/282,296, filed Sep. 30, 2016, 36 pages.

* cited by examiner

| Push Message | Reviewer A | Reviewer B | Reviewer C |
|---|---|---|---|
| Push Message 505 | Approve | Disapprove | Approve |
| Push Message 510 | Disapprove | Pending | Approve |
| Push Message 515 | Pending | Approve | Approve |

VALIDATING PUSH COMMUNICATIONS

BACKGROUND

This disclosure relates to push communications, and more particularly, to validating push messages. Push messages are often sent by entities such as corporations, educational institutions, and so forth as a means of efficiently communicating with users such as students, employees, customers, etc. A push message, for example, may be sent by the entity to hundreds, thousands, or even millions of different users. Typically, an individual within an organization is tasked with authoring the push message. The push message is ordinarily composed using a Web-based console. Upon the author selecting a "send" option from within the Web-based console, the push message is delivered to a push message delivery system.

The push message delivery system is usually owned and/or operated by another party. The push message delivery system maintains a listing of users (e.g., potential recipients) to which push messages may be delivered. Once the push message reaches the push message delivery system, the push message is automatically distributed to the intended recipients. As noted, in the typical case, the push message is distributed to thousands or possibly millions of recipients. Once distributed, the push message appears on the devices of the intended recipients.

Due to the significant number of recipients of a single push message, one can see that the content of a push message is important. The direct link between the Web-based console and the push message delivery system makes detecting errors and/or other content that may violate established policies of the sending entity difficult. There exists a real possibility that a poorly crafted push message intended to be informative and helpful to users may be misconstrued thereby damaging the relationship between the sending entity and the recipients.

SUMMARY

One or more embodiments are directed to a method of validating push messages. The method can include, responsive to receiving a push message intended for delivery to a recipient, storing, using a processor, the push message within an approval queue, sending, using the processor, a message including content of the push message to a reviewing device of a reviewing user, and receiving, using the processor, a reply from the reviewing device. The push message can be selectively provided, using the processor, from the approval queue to a push message delivery system based upon whether the reply indicates approval of the content of the push message.

By intercepting a push message prior to delivery of the push message to a push message delivery system, the push message may be validated or otherwise reviewed by one or more users before reaching the intended recipients. In this regard, the push message is selectively provided to the push message delivery system based upon whether the reply indicates approval of the content of the push message. The message provided to the reviewing device may be a newly created message. Alternatively, the message provided to the reviewing device may be a forward of the push message.

In one aspect, the message is an Unstructured Supplementary Service Data (USSD) message. In another aspect, the reply is a USSD message. Use of USSD messages facilitates a streamlined interaction with the reviewing users in that many mobile devices support USSD natively and do not require additional applications or other software. Further, USSD allows a receiving user to respond to a message using a keypad, e.g., a numeric keypad.

In another aspect, the push message can be provided from the approval queue to the push message delivery system only responsive to determining that the reply indicates approval. In a further aspect, the message is sent to reviewing devices of a plurality of reviewing users. In that case, the push message can be provided from the approval queue to the push message delivery system only responsive to determining that a reply is received from each of the plurality of users and that each reply indicates approval. Thus, any push message that is disapproved by one or more users is not automatically provided to the push message delivery system for delivery to the intended recipients. This action functions as a safeguard by preventing the sending of content that is erroneous, non-compliant with one or more policies, etc.

In another aspect, the push message is maintained within the approval queue and not provided to the push message delivery system responsive to determining that the reply indicates disapproval. Keeping the push message stored in the approval queue in the event that at least one of the replies indicates disapproval facilitates editing and/or correction of the push message prior to delivery to the intended recipients.

In another aspect, the reply can include a comment. In that case, the method can include storing an indication of whether the reviewing user approved the content of the push message within the approval queue in association with the push message and storing the comment within the approval queue in association with the push message. By persisting comments, the author of the push message is able to ascertain the reason why the content of the push message was rejected.

In another aspect, the method can include determining the reviewing user and an address for the reviewing user responsive to receiving the push message. The reviewing user or reviewing users, as the case may be, may be determined using any of a variety of different mechanisms that facilitate usage of one or more default reviewing users, a specialized committee of one or more reviewing users, and so forth. The reviewing users may be specified based upon various criteria including, but not limited to, identity of the sending user, membership of the sending user within a group of users, the role of the sending user, or the like.

One or more embodiments are directed to a system for validating push messages. The system includes a processor configured to initiate operations. The operations can include, responsive to receiving a push message intended for delivery to a recipient, storing the push message within an approval queue, sending a message including content of the push message to a reviewing device of a reviewing user, and receiving a reply from the reviewing device. The push message can be selectively provided from the approval queue to a push message delivery system based upon whether the reply indicates approval of the content of the push message.

In one aspect, the message is a USSD message. In another aspect, the reply is a USSD message.

In another aspect, the push message can be provided from the approval queue to the push message delivery system only responsive to determining that the reply indicates approval. In a further aspect, the message is sent to reviewing devices of a plurality of reviewing users. In that case, the push message can be provided from the approval queue to the push message delivery system only responsive to determining that a reply is received from each of the plurality of users and that each reply indicates approval.

In another aspect, the push message is maintained within the approval queue and not provided to the push message delivery system responsive to determining that the reply indicates disapproval.

In another aspect, the reply can include a comment. In that case, the operations can include storing an indication of whether the reviewing user approved the content of the push message within the approval queue in association with the push message and storing the comment within the approval queue in association with the push message.

In another aspect, the processor is configured to initiate operations that include determining the reviewing user and an address for the reviewing user responsive to receiving the push message.

One or more embodiments are directed to a computer program product for validating push messages. The computer program product can include a computer readable storage medium having program instructions embodied therewith. The program instructions are executable by a processor to cause the processor to initiate operations including, responsive to receiving a push message intended for delivery to a recipient, storing, using a processor, the push message within an approval queue, sending, using the processor, a message including content of the push message to a reviewing device of a reviewing user, and receiving, using the processor, a reply from the reviewing device. The push message can be selectively provided, using the processor, from the approval queue to a push message delivery system based upon whether the reply indicates approval of the content of the push message.

In one aspect, the message is a USSD message. In another aspect, the reply is a USSD message.

In another aspect, the push message can be provided from the approval queue to the push message delivery system only responsive to determining that the reply indicates approval. In a further aspect, the message is sent to reviewing devices of a plurality of reviewing users. In that case, the push message can be provided from the approval queue to the push message delivery system only responsive to determining that a reply is received from each of the plurality of users and that each reply indicates approval.

In another aspect, the push message is maintained within the approval queue and not provided to the push message delivery system responsive to determining that the reply indicates disapproval.

In another aspect, the reply can include a comment. In that case, the method can include storing an indication of whether the reviewing user approved the content of the push message within the approval queue in association with the push message and storing the comment within the approval queue in association with the push message.

In another aspect, the program instructions are executable by a processor to cause the processor to initiate operations further including determining the reviewing user and an address for the reviewing user responsive to receiving the push message.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
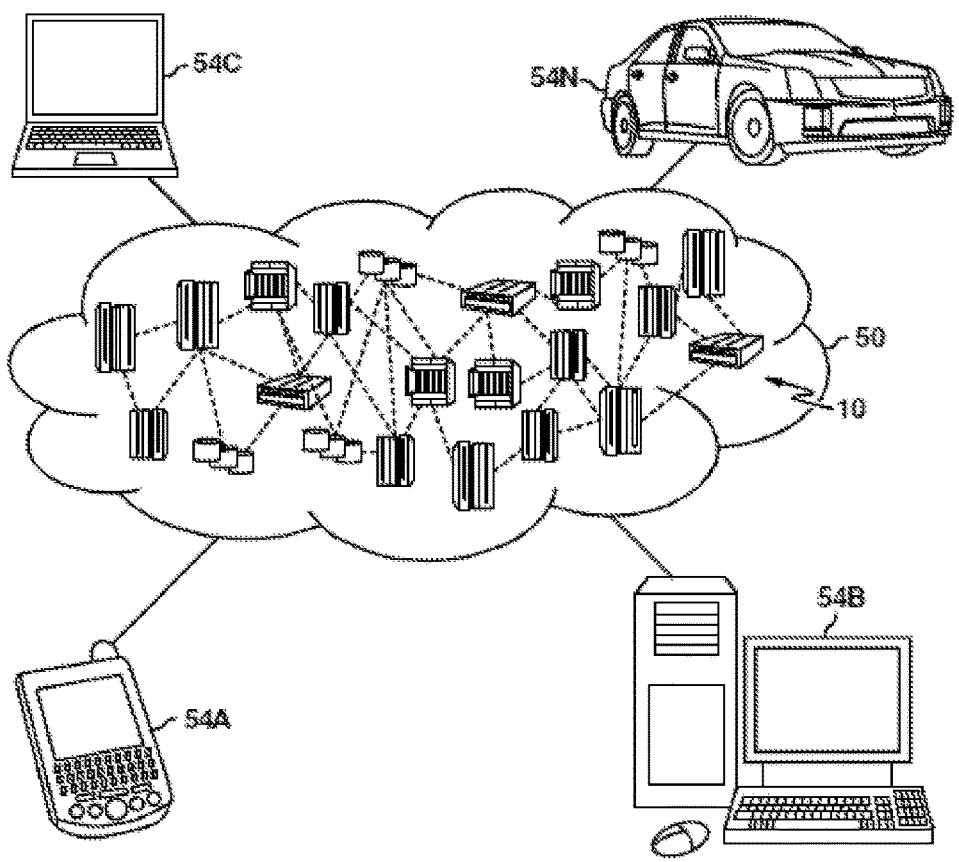
FIG. 1 depicts a cloud computing environment according to an embodiment of the present invention.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
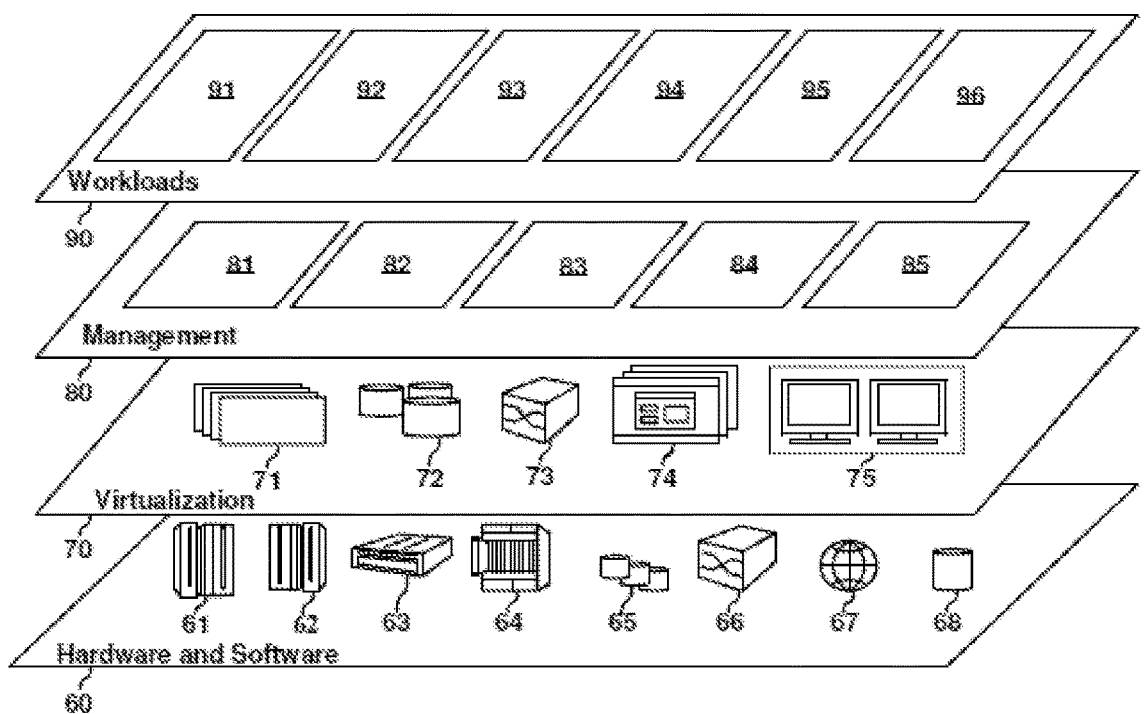
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and push validation system 96.

In one or more embodiments, push validation system 96 is capable of receiving and/or intercepting push messages. As defined herein, a "push message" means information that is delivered from a software application executing on a computing system to a computing device without a specific request from the computing (e.g., recipient) device(s). Push validation system 96 is capable of storing received push messages within an approval queue. Push validation system 96 is further capable of distributing messages that include content of push messages stored in the approval queue to one or more devices of users tasked with validation and/or review of push message content. Reviewing users may reply to the received message with approval or disapproval. In the event that the reviewing user disapproves, the reviewing user further may provide comments such as suggested edits for the push message within the reply.

Push validation system 96 is capable of receiving replies from the reviewing devices. Push validation system 96 is capable of determining whether each reply from a reviewing device for a given push message is an approval or a disapproval. In response to determining that each reply, e.g., the reply from each of the reviewing users, is an approval, push validation system 96 is capable of sending the push message from the approval queue to a push message delivery system. In response to determining that at least one reply is a disapproval, push validation system 96 is capable of maintaining the push message within the approval queue for editing. Further features of push validation system 96 are described below in greater detail.

Figure 3:
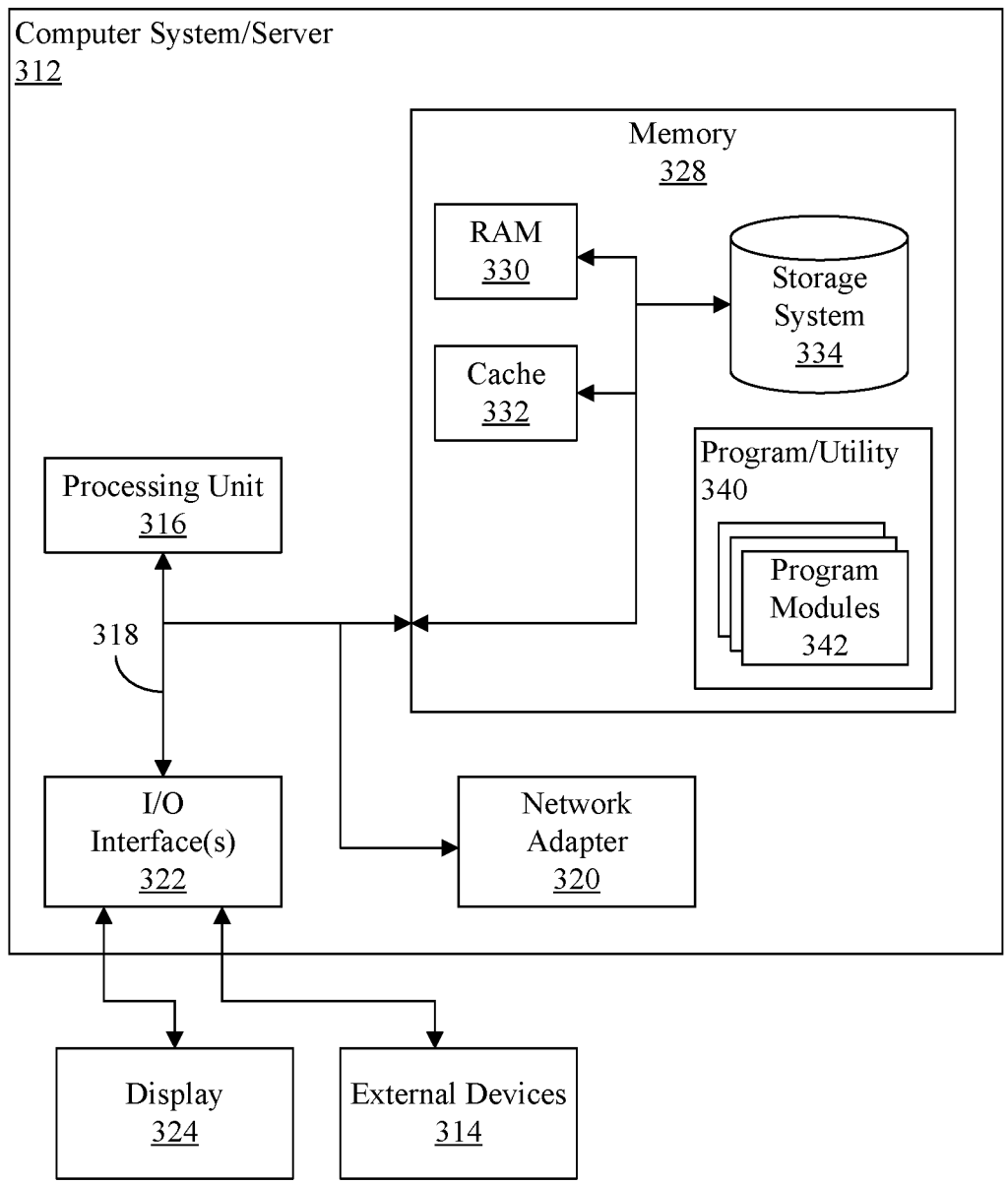
FIG. 3 depicts a cloud computing node according to an embodiment of the present invention.

Referring now to FIG. 3, a schematic of an example of a cloud computing node is shown. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

Cloud computing node 300 includes a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 300 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media may be any available media that is accessible by computer system/server 312, and it includes both volatile and non-volatile media, removable and non-removable media.

Memory 328 can include computer system readable media in the form of volatile memory, such as random access memory (RAM) 330 and/or cache memory 332. Computer system/server 312 may further include other removable/non-removable, volatile/non-volatile computer system storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

For example, one or more of the program modules may include push validation system 96 or portions thereof. Program/utility 340 is executable by processing unit 316. Program/utility 340 and any data items used, generated, and/or operated upon by node 300 are functional data structures that impart functionality when employed by node 10. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

While node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

Figures 4, 5:
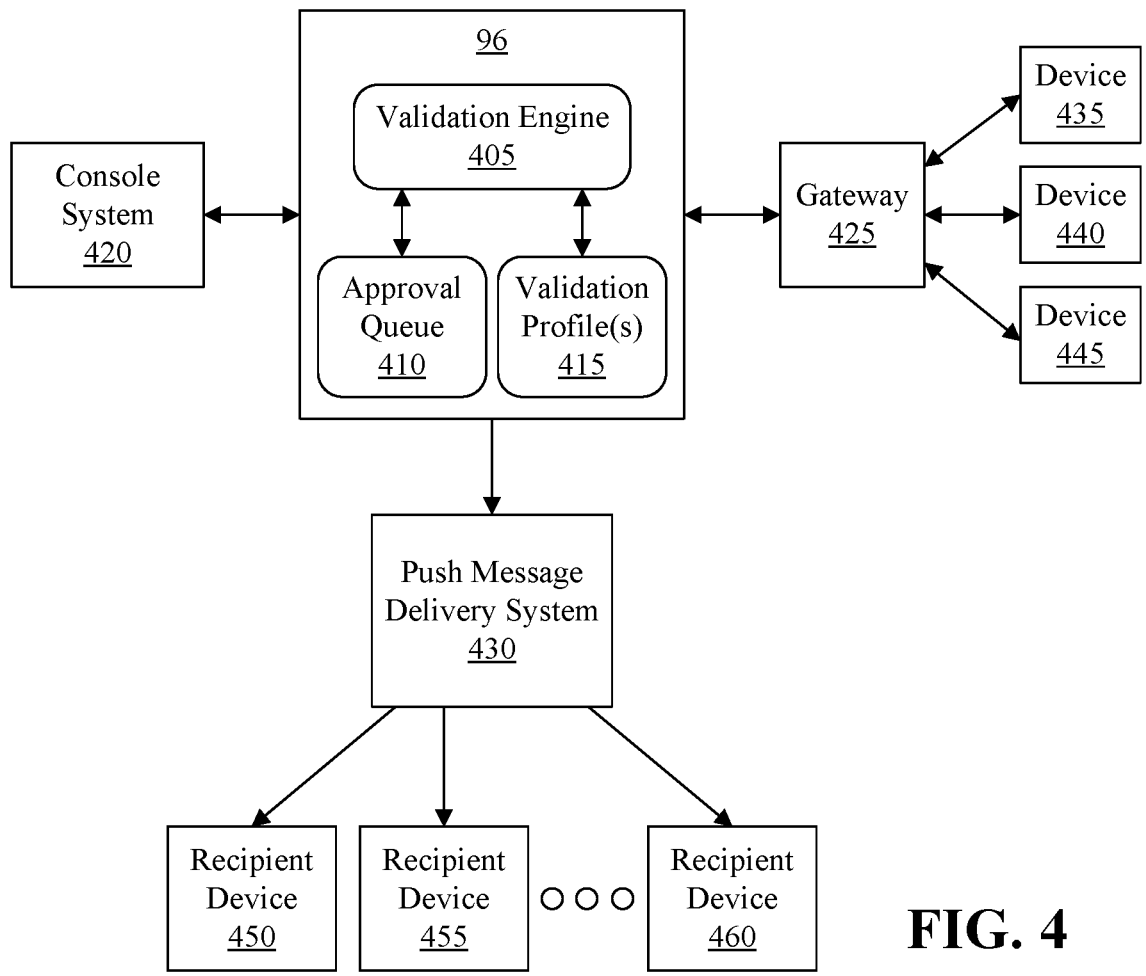
FIG. 4 depicts a push validation system and operation thereof according to an embodiment of the present invention.
FIG. 5 depicts an example view of a user interface according to an embodiment of the present invention.

FIG. 4 depicts push validation system 96 and operation thereof according to an embodiment of the present invention. In the example of FIG. 4, push validation system 96 includes a validation engine 405, an approval queue 410, and one or more validation profile(s) 415. Push validation system 96 is capable of communication with a console system 420, a gateway 425, and a push message delivery system 430.

Console system 420 may be implemented as one or more networked data processing systems. Console system 420 is configured for a user to author and/or create a push message. In one example, console system 420 is a Web-based system through which a user may create a push message. In conventional systems, in response to the user sending the push message, the console system provides the push message directly to a push message delivery system such as push message delivery system 430.

In one embodiment, console system 420 may include a first control and a second control. User selection of the first control causes console system 420 to send the push message directly to push message delivery system 430. User selection of the second control causes console system 420 to send the push message to push validation system 96. In another embodiment, console system 420 is configured to only send push messages to push validation system 96.

In accordance with one or more embodiments described herein, push validation system 96 is capable of intercepting push messages created and sent by console system 420. In one embodiment, validation engine 405 receives a push message from console system 420. Validation engine 405 is capable of storing the received, or intercepted, push message within approval queue 410. Approval queue 410 is configured to store one or more push messages for which approval is being sought. Thus, rather than conveying the push message to push message delivery system 430, push validation system 96 performs various additional operations and ensures that specific conditions are met before the push message is passed on to push message delivery system 430.

In one embodiment, validation engine 405, upon receiving a push message, determines one or more designated users that are tasked with reviewing and approving the push message. Users tasked with reviewing a push message are called "reviewing users" within this disclosure. A device of a reviewing user is referred to as a "reviewing device". From time to time within this disclosure, the terms "reviewing user" and "reviewing device" are used interchangeably. In this regard, it should be appreciated that a statement to the effect that a message is sent or provided to a reviewing user or that a message is sent by a reviewing user means that the message is sent or provided to the reviewing device of the reviewing user or that the message is sent by the reviewing device of the reviewing user.

In another embodiment, each of validation profiles 415 stores a list of one or more reviewing users. Each validation profile 415 may be associate with a particular sender. For example, for a given sender a validation profile may be stored that lists the reviewing users for push messages received from that sender. A sender may be a particular entity, a particular user at the entity, a particular group of users at the entity, etc. This allows a custom tailored group of reviewing users to be established for different areas, topics, and so forth within the entity.

In one aspect, validation profile(s) 415 may be edited by a user such as an administrator working through push validation system 96. In another aspect, a user working through console system 420, e.g., an administrator or other user with sufficient privileges, etc., may edit validation profile(s) 415.

In another embodiment, the list of reviewing users in a given validation profile 415 includes an address for one or more devices of the reviewing user(s). The address may be any of a variety of different addresses depending upon the particular communication channel used to distribute the content of received push messages for review to the reviewing users. In one example, the address is an electronic mail address. In another example, the address is a mobile phone number.

As an illustrative and non-limiting example, a company's communication department may choose a committee of reviewing users that are tasked with reviewing content of push messages to be sent to recipients. The reviewing users and/or mobile phone numbers of the selected reviewing users may be added to a validation profile 415. Each committee member may have a particular expertise and/or represent a different department such as marketing, human resources, operations, etc. In this regard, each department may have one or more requirements for push message content that should be met or checked before sending the push message to the recipients. The reviewing user for each department reviews the content of push messages in accordance with the requirements of that department.

Validation engine 405 is capable of determining the reviewing users for a received push message and distributing the push message to the reviewing users via gateway 425. In one or more embodiments, validation engine 405 is capable of creating a new message adapted to a selected communication channel and including the content, e.g., the body, of the push message to be reviewed within the message. Validation engine 405 is capable of accessing gateway 425 to send the message to reviewing devices 435-445. Thus, in one or more embodiments, push validation system is not forwarding the push message to reviewing devices 435-445.

In one or more other embodiments, however, validation engine 405 may forward the push message to reviewing devices 435-445.

Gateway 425 is capable of routing messages between validation engine 96 and reviewing devices 435, 440, and 445. It should be appreciated that the number of reviewing devices shown is for purposes of illustration and not limitation. Fewer or more reviewing devices may be included depending upon the validation profile(s) 415. Gateway 425 may be any of a variety of different gateway types depending upon the particular communication channel that is used to provide content of the push message to be reviewed to the reviewing users. Example communication channels include, but are not limited to, electronic mail, instant messaging, short-message service (SMS), multimedia messaging service (MMS), and so forth. Thus, gateway 425 may be implemented as an electronic mail server, an instant messaging gateway, an SMS gateway, etc. depending upon the particular communication channel that is used.

In one embodiment, the communication channel is Unstructured Supplementary Service Data (USSD). In that case, gateway 425 is a USSD gateway. Accordingly, gateway 425 is capable of routing USSD messages between push validation system 96 and reviewing devices 435, 440, and 445. Accordingly, validation engine 405 is capable of generating a USSD message that includes the content of the push message that is to be reviewed. USSD is a session-based protocol. USSD messages travel over GSM signaling channels and can be used to query information and trigger services. Unlike store and forward services such as SMS and MMS, USSD establishes a real-time session between the receiving device (e.g., a mobile handset) and the application handling the service (e.g., push validation system 96).

Validation engine 405 is capable of receiving a reply from each of devices 435-445. In one embodiment validation engine 405 stores the received replies in association with the particular push message, or content thereof, provided to reviewing devices 435-445 for review. Validation engine 405 is capable of determining whether a reply is received from each of devices 435-445. Further validation engine 405 is capable of determining whether the reply from each of reviewing devices 435-445 indicates approval. If the case where validation engine 405 determines that a reply is received from each of reviewing devices 435-445 and each reply indicates approval, validation engine 405 is capable of sending the push message to push message delivery system 430. In one embodiment, validation engine 405 only forwards the push message to push message delivery system 430 responsive to receiving an approve reply from each of the reviewing users for the push message. Validation engine 405 is capable of removing or deleting the approved push message from approval queue 410. Push message delivery system 430, upon receiving the push message, distributes the push message to the intended recipients, e.g., recipient devices 450, 455, and 460.

In the case where at least one reply from a reviewing device 435-445 indicates disapproval, validation engine 405 is capable of maintaining the push message within approval queue 410. Further, validation engine 405 does not provide the push message to push message delivery system 430. Any comments from reviewing devices 435-445 also are stored in association with the push message within approval queue 430.

In one or more embodiments, the author of the push message or other user may view the status of the push message via console system 420. For example, console system 420 may display an inbox view showing push messages and the approval/disapproval status as obtained from approval queue 410. The author may view comments from reviewing users and edit the push messages. Once edited, the author (e.g., a user), working through console system 420, may select an option that causes push validation system 96 to initiate the review process for the edited push message anew.

Push validation system 96 allows multiple different stakeholders, e.g., reviewing users, to validate content, style, and conformance of the push message with policies of the enterprise. The reviewing users, for example, may be in different departments such as information technology, communications, etc. Push validation system 96 facilitates the review and approval of push messages prior to dissemination to recipients. Any push messages that are disapproved may be edited prior to releasing the push message to a push message delivery system.

FIG. 5 depicts a view 500 of a user interface according to an embodiment of the present invention. View 500 is an example of an inbox that may be presented to an author of a push message. For example, view 500 may be presented to a user through console system 420. View 500 utilizes data obtained from push validation system 96. In the example of FIG. 5, view 500 lists a plurality of different push messages 505, 510, and 515 that are currently under review. For example, the user may have composed push messages 505, 510, and 515 and submitted the push messages for review through push validation system 96 as described herein.

View 500 indicates a status of each of push messages 505-515 on a pre reviewing user basis. As discussed, a push message that is approved by each of the reviewing users may be removed from the approval queue and provided to the push message delivery system. Thus, view 500 does not include push messages that have been approved by each reviewing user.

As pictured, push message 505 has a status of approve, disapprove, and approve. Thus, reviewer A has approved of the content of push message 505; reviewer B has disapproved of the content of push message 505; and reviewer C has approved of the content of push message 505. Push message 510 has a status of disapprove, pending, and approve. Thus, reviewer A has disapproved of the content of push message 510; reviewer B has not yet responded and has a status of pending; and reviewer C has approved of the content of push message 510. Push message 515 has a status of pending, approve, and approve. Thus, reviewer A has not yet responded; reviewer B has approved of the content of push message 515; and reviewer C has approved of the content of push message 515.

In one or more other embodiments, view 500 further may list or display the actual comments received from reviewing users. For example, a user may select a "Disapprove" status indicator thereby causing the system to display the comments from the reviewing user that disapproved. In one or more other embodiments, the author user may select a particular push message, e.g., push message 505, to edit the push message. Once edited, the user may again select an option that restarts the review or validation process described herein for the edited push message.

Figure 6:
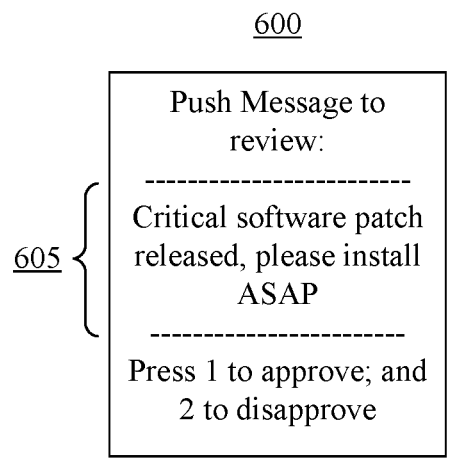
FIG. 6 depicts an example view of another user interface according to an embodiment of the present invention.

FIG. 6 depicts a view 600 of another user interface according to an embodiment of the present invention. View 600 is an example of a user interface displayed on a reviewing device upon receiving a message including the content of a push message to be reviewed. In the example of FIG. 6, the message received by the reviewing device is a USSD message. The reviewing user is provided with the content of the push message to be reviewed in section 605.

The user interface further shows instructions as to how to approve or disapprove (reject) the content of the push message.

In one embodiment, responsive to disapproving the message, the reviewing user may enter comments, e.g., text, explaining why the reviewing user is disapproving the content of the push message. For example, a further user interface may be displayed or a text field may be displayed that is configured to receive textual input and/or other comments from the reviewing user.

In one example, responsive to selecting "1," the reviewing device generates a USSD message indicating approval and sends the USSD message to push validation system 96 as a reply. In another example, responsive to selecting "2," the reviewing device generates a USSD message indicating disapproval and sends the USSD message to push validation system 96 as a reply. In still another example, responsive to selecting "2," the reviewing device receives user input specifying comments from the reviewing user, generates a USSD message including the comments and indicating disapproval, and sends the USSD message to push validation system 96 as a reply.

The use of USSD messages between push validation system 96 and reviewing devices facilitates ease of operation and real-time operation. USSD allows a user to utilize keypad entry, e.g., numerical entry, without having to execute or implement an additional application within the reviewing device. Further, additional layers for translation of messaging formats and/or protocols that may be needed to support instant messaging, electronic mail, and so forth are not needed in the case of USSD.

Figure 7:
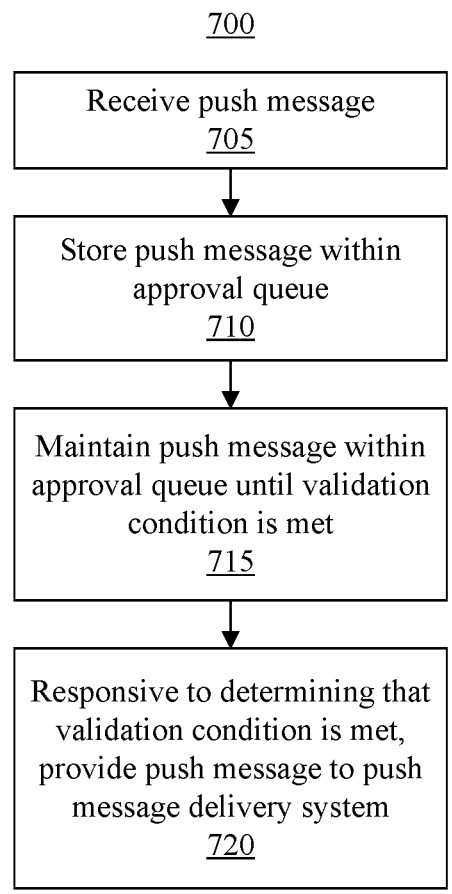
FIG. 7 depicts a method of validating a push message according to an embodiment of the present invention.

FIG. 7 depicts a method 700 of validating a push message according to an embodiment of the present invention. Method 700 may be implemented by push validation system 96. For example, push validation system 96 is executed by a data processing system, whether using one or more servers in a non-cloud computing environment or by one or more data processing systems in a cloud computing environment. Method 700 may be performed for each received push message to be validated.

Method 700 may begin in a state where a user (e.g., an author), has created a push message. The user further may have designated one or more recipients for the push message. The user, working through a console, for example, selects an option to send the push message or to send the push message for validation. Accordingly, in block 705, the push validation system receives the push message. In block 710, the push validation system, responsive to receiving the push message, stores the push message within the approval queue.

In block 715, the push validation system maintains, or keeps, the push message within the approval queue until a validation condition is met. In one or more embodiments, the validation condition is determined from a reply received from one or more reviewing users. For example, the push validation system is capable of sending a message including content of the push message to a reviewing device of a reviewing user and receiving a reply from the reviewing device. In that case, the validation condition is or includes determining that the reply indicates approval of the content of the push message.

In block 720, the push validation system, responsive to determining that the validation condition is met, provides the push message from the approval queue to a push message delivery system.

Figure 8:
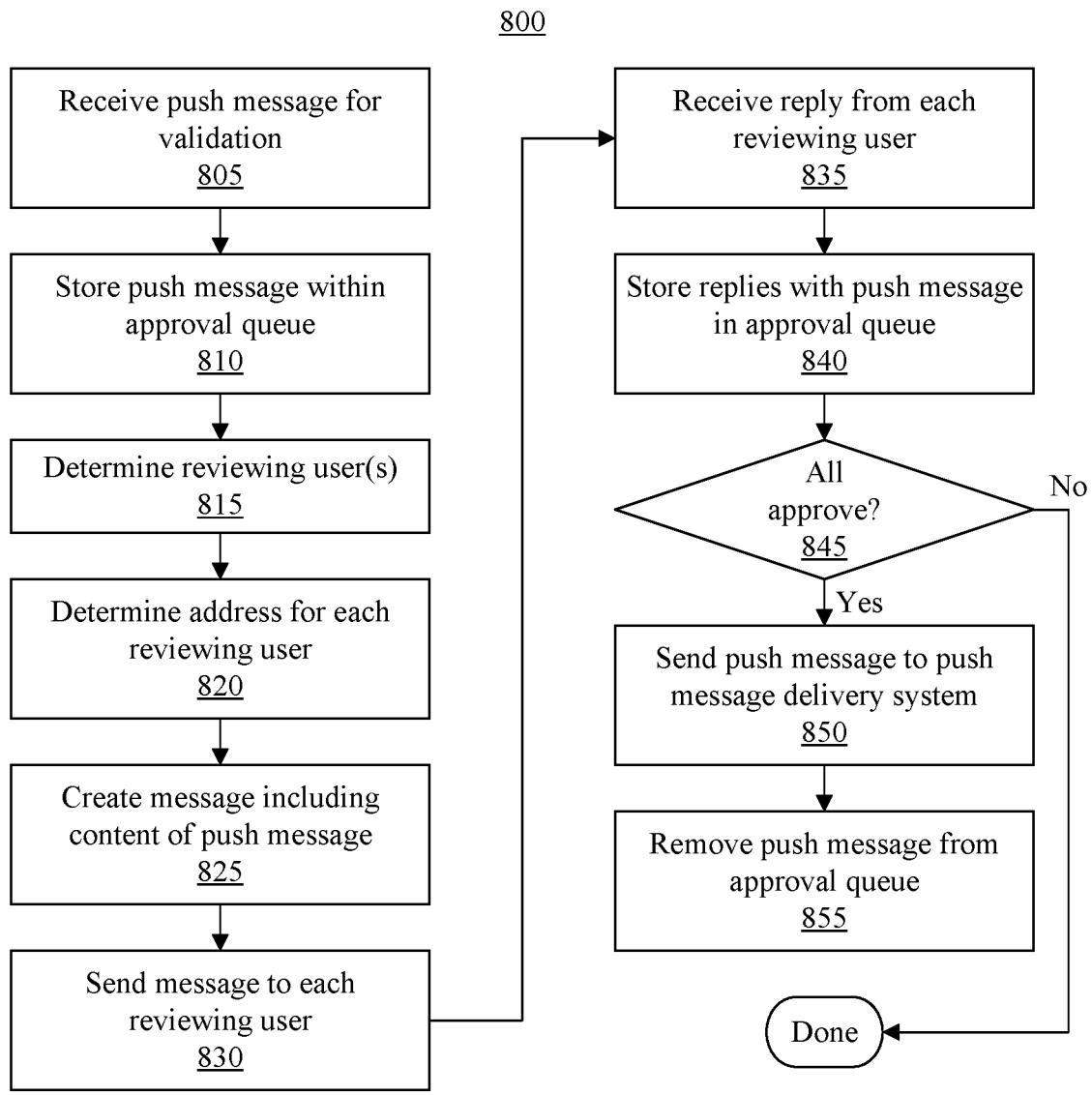
FIG. 8 depicts another method of validating a push message according to an embodiment of the present invention.

FIG. 8 depicts another method 800 of validating a push message according to an embodiment of the present invention. Method 800 may be implemented by push validation system 96. For example, push validation system 96 is executed by a data processing system, whether using one or more servers in a non-cloud computing environment or by one or more data processing systems in a cloud computing environment. Method 800 may be performed for each received push message to be validated. In one embodiment, FIG. 8 illustrates a more detailed implementation than that of FIG. 7.

Method 800 may begin in a state where a user (e.g., an author), has created a push message. The user further may have designated the recipients for the push message. The user, working through a console, for example, selects an option to send the push message or to send the push message for validation. In block 805, the push validation system receives the push message for validation. In one aspect, the push validation system intercepts the push message that is sent from the console system prior to being provided to a push message delivery system. In block 810, the push validation system stores the push message within the approval queue.

In block 815, the push validation system determines the reviewing user or users, as the case may be, for the push message received in block 805. The reviewing user(s) may be specified on a per push message basis, may be specified based upon the identity of the sending user, a role of the sending user, a department or group to which the sending user belongs, and so forth. In another embodiment, the user that creates the push message or sends the push message may manually designate or select the reviewing user(s) for the push message.

The push validation system may begin to perform one or more operations to determine whether and/or when a validation condition is met. As discussed, in one or more embodiments, the validation condition is the receipt of approval from each of the reviewing users tasked with reviewing content of a particular push message.

In block 820, the push validation system determines an address for each reviewing user determined in block 815 for the push message. In block 825, the push validation system creates a message including content of the push message to be reviewed. The system is capable of creating a message adapted for sending over a different communication channel than the received push message. In one or more embodiments, the message is an electronic mail, an SMS, an IM, an MMS message, etc. In one or more other embodiments, the message is a USSD message.

In block 830, the push validation system sends the message to each reviewing user. In block 835, the push validation system receives a reply from each reviewing user. In one embodiment, the system receives the reply using the same communication channel over which the message sent in block 830 is sent. For example, in the case of the system sending a USSD message, the reply from each reviewing user may be a USSD message. In any case, the reply indicates whether the reviewing user approves of the content of the push message. The reply from each reviewing user indicates either approval or disapproval. The push validation system may wait for a reply from each reviewing and update the approval queue with replies as received.

In one embodiment, in the case where the reply indicates disapproval, the reply further includes comments from the reviewing user. The comments may indicate why the reviewing user disapproved of the content of the push message. In another embodiment, the reply does not include comments and only indicates disapproval of the reviewing user. The author of the push message, for example, may contact the reviewing user to learn the particular reasons why the reviewing user did not approve of the message.

In block 840, the push validation system stores the replies with (e.g., in association with) the push message in the approval queue. For example, the push validation system may use a database or other data structure to store the push message and the received replies. In another embodiment, the push validation system may parse the received replies and store the indication (approval or disapproval) and any comments that are received within the reply.

In block 845, the push validation system determines whether each of the reviewing users approved the content of the push message. If, as noted, the push validation system receives a reply from each reviewing user and determines that each reply indicates approval, method 800 may continue to block 850. In that case, the validation condition is met. If at least one reply indicates disapproval, the validation condition is not met and method 800 may end.

It should be appreciated that a user may edit the push message and initiate the validation process anew for the edited push message. In one embodiment, the push message may remain within the approval queue so as to be available to the user for editing. Further, the push message remains available for further validation operations as described herein. In the case where an edited push message is to undergo validation again, blocks 805 and 810 may be omitted. Further, the push validation system may retrieve the edited push message from the approval queue.

In another embodiment, editing of the push message may cause the push message to be removed from the approval queue. In that case, where the edited message is to undergo validation again, method 800 may be performed anew.

In block 850, the push validation system sends the push message to the push message delivery system. In block 855, the push validation system removes, e.g., deletes, the push message that was approved and sent to the push message delivery system from the approval queue.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions. For example, the instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real-time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The terms first, second, etc. may be used herein to describe various elements. These elements should not be limited by these terms, as these terms are only used to distinguish one element from another unless stated otherwise or the context clearly indicates otherwise.

The descriptions of the example embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of validating push messages, comprising:

receiving, using a first processor, from another system comprising a second processor, a push message intended for delivery to a plurality of recipients;

responsive to receiving, from the another system, the push message intended for delivery to the plurality of recipients, storing, using the first processor, the push message within an approval queue;

sending, from the system to a plurality of reviewing devices of a plurality of reviewing users, a message including content of the push message;

receiving, using the processor, a reply from each of the plurality of the reviewing devices; and selectively providing, using the processor, the push message from the approval queue to a push message delivery system based upon whether the reply from each of the plurality of reviewing devices indicates approval of the content of the push message, wherein the push message delivery system is configured to communicate the push message to a plurality of recipient devices.

2. The method of claim 1, wherein the message is an Unstructured Supplementary Service Data message.

3. The method of claim 1, wherein the reply is an Unstructured Supplementary Service Data message.

4. The method of claim 1, wherein the push message is provided from the approval queue to the push message delivery system only responsive to determining that the reply from each of the plurality of reviewing devices indicates approval.

5. The method of claim 1, wherein the push message is maintained within the approval queue and not provided to the push message delivery system responsive to determining that the reply from at least one of the plurality of reviewing devices indicates disapproval.

6. The method of claim 1, wherein the reply from at least one of the plurality of reviewing devices comprises a comment, the method further comprising:

storing an indication of whether each of the plurality of reviewing users approved the content of the push message within the approval queue in association with the push message; and storing the comment within the approval queue in association with the push message.

7. The method of claim 1, further comprising:

determining each of the plurality of reviewing users and an address for each of the reviewing users responsive to receiving the push message.

* * * * *